United States Patent
Aota et al.

[11] Patent Number: 5,954,362
[45] Date of Patent: Sep. 21, 1999

[54] POWER TRANSMISSION SHAFT IN A STEERING UNIT AND ASSEMBLY METHOD THEREOF

[75] Inventors: Kenichi Aota, Shikigun; Motohiro Morita, Kashiwara, both of Japan

[73] Assignees: Koyo Seiko Co., Ltd.; Koyo Machine Industries, Ltd., both of Osaka, Japan

[21] Appl. No.: 08/865,192

[22] Filed: May 29, 1997

[30] Foreign Application Priority Data

May 30, 1996 [JP] Japan ................................. 8-136394

[51] Int. Cl.⁶ ....................................................... B62D 1/19
[52] U.S. Cl. ........................... 280/777; 74/492; 188/371; 29/517; 29/525
[58] Field of Search ........................ 280/777; 74/492; 188/371, 374; 29/517, 516, 252, 525

[56] References Cited

U.S. PATENT DOCUMENTS

| | | | |
|---|---|---|---|
| 4,572,022 | 2/1986 | Mettler | 74/492 |
| 5,235,734 | 8/1993 | DuRocher et al. | 280/777 |
| 5,623,756 | 4/1997 | Yanagidate et al. | 280/777 |

FOREIGN PATENT DOCUMENTS

| | | |
|---|---|---|
| 06-12649 A1 | 8/1994 | European Pat. Off. |
| 2-508860 | 1/1983 | France . |
| 2-322451 | 11/1974 | Germany . |
| 2292989 | 3/1996 | United Kingdom . |

*Primary Examiner*—Peter C. English
*Attorney, Agent, or Firm*—Birch, Stewart Kolasch & Birch, LLP

[57] ABSTRACT

A power transmission shaft in a steering unit shortens in an axial direction when an impact load, over a specified impact load, is applied thereto, and thereby absorbs impact. The power transmission shaft includes a hollow shaft having a female serration on the inner circumference thereof. An insertion shaft has a male serration on the outer circumference thereof that engages with the female serration of the hollow shaft when inserted into the hollow shaft. The hollow shaft and the insertion shaft are connected with each other so that they can transmit power in the circumferential direction, yet they are displaceable in the axial direction. An inward depressed portion is formed on the hollow shaft to establish the impact absorption of the power transmission shaft. A concave portion, formed on the insertion shaft aids in the uniform formation of the depressed portion and thereby simplifies the assembly process.

9 Claims, 4 Drawing Sheets

POWER TRANSMISSION SHAFT IN A STEERING UNIT AND ASSEMBLY METHOD THEREOF

BACKGROUND OF THE INVENTION

1. Field of the Invention

The present invention relates to a power transmission shaft in a steering unit that shortens in an axial direction when impacted by a specified impact load and thereby absorbs impact, and a method for assembling thereof. The power transmission shaft herein is an intermediate shaft that is arranged between a steering shaft and a steering gear in an automobile steering unit. A steering column is arranged between the steering shaft and a steering wheel.

2. Description of Related Art

FIG. 4 shows a structure of a conventional steering unit in an automobile. In the FIG., 1 represents a steering wheel, 2 a steering column, 3 a steering shaft, 4 a steering gear, 5 and 6 universal joints respectively, and 7 represents an intermediate shaft.

The intermediate shaft 7 transmits turning power from the steering wheel 1 to the steering gear 4. Upon excessive impact owing to a collision, the intermediate shaft 7 shortens to thereby absorb impact so that such impact is not transmitted to the automobile driver.

FIG. 5 is a side view of an important portion of the intermediate shaft 7. The intermediate shaft 7 comprises a hollow shaft 8 and an insertion shaft 9 which are so connected as to be able to move in an axial direction respectively. A female serration is arranged on the inner circumference of the hollow shaft 8, while arranged on the outer circumference at the end of the insertion shaft 9 is a male serration 9a that engages with the female serration of the hollow shaft 8. A circumferential slot 10 is formed on the outer circumference of the insertion shaft 9 in the area having the male serration 9a. In the hollow shaft 8, two radial holes 11 are arranged at two positions that are opposite by 180 degrees. The holes 11 are positioned to correspond to the above-mentioned circumferential groove 10 when the insertion shaft 9 is inserted into the hollow shaft 8. Through the holes 11, a resin 12 is filled between the circumferential groove 10 and the hollow shaft 8. When the resin 12 is hardened, the hollow shaft 8 and the insertion shaft 9 are connected integrally.

In the intermediate shaft 7 of the structure mentioned above, when excessive impact occurs, the resin 12 is sheared, and the insertion shaft 9 goes into the hollow shaft 8. By this occurrence, the entire intermediate shaft 7 shortens, and thus absorbs the impact.

In the above conventional example, the resin 12 must be hardened in the course of production. Accordingly, the conventional example suffers bad working efficiency, and causes high production costs.

Further, the conventional steering unit, assembled in an engine room, will be subjected to high temperatures. Therefore, it is necessary to prevent deterioration of the strength of the resin 12. When the strength of the resin 12 is deteriorated for some reason, a desired, specified shear resistance may not be attained, leading to unpredictable variations of draft load. Draft load means an impact load sufficient to shear the resin 12 and thereby shorten the intermediate shaft 7. Moreover, when the resin 12 is sheared, draft load is apt to decline sharply, therefore, sufficient considerations must be paid to impact absorption.

The steering column 2 shown in FIG. 4 comprises a hollow shaft and an insertion shaft similar to the above-mentioned intermediate shaft 7. The hollow shaft and insertion shaft are connected integrally by use of the resin 12 as shown in FIG. 5 to form an impact absorbing structure. As a consequence, the steering column 2 also has nonconformities similar to those mentioned above.

SUMMARY OF THE INVENTION

Accordingly, an object of the present invention is to provide a power transmission shaft in a steering unit, that can be produced efficiently, thereby reducing the production and assembly process costs.

Further, another object of the present invention is to provide a power transmission shaft in a steering unit, that exhibits a constant draft load irrespective of ambient temperature.

Moreover, another object of the present invention is to provide a power transmission shaft in a steering unit, wherein draft load does not decrease rapidly upon impact, but remains for a while. Thereby, impact is absorbed more sufficiently and securely. The power transmission shaft of the present invention includes an insertion shaft formed with a male serration and a hollow shaft formed with a female serration. A concave portion is formed in the insertion shaft, and the insertion shaft is inserted into the hollow shaft. A portion of the hollow shaft is deformed into the concave portion of the insertion shaft, thereby forming a depressed portion in the hollow shaft. The insertion shaft is then further inserted into the hollow shaft so that the depressed portion leaves the concave portion and engages the male serration at a location spaced from the concave portion.

Other objects, constructions, operations, and effects of the present invention will become apparent more fully from the description given below, but it should be understood that the description and examples given below are intended to illustrate the present invention, and not to limit the scope of the present invention, since many modifications and variations of the examples disclosed herein are within the scope of the present invention.

BRIEF DESCRIPTION OF THE DRAWINGS

The accompanying drawings, which are incorporated in and form a part of this specification, illustrate embodiments of the present invention and, together with the description serve to explain the principles of the present invention. In all these Figures, like components are indicated by the same numerals.

In the drawings.

DETAILED DESCRIPTION OF THE INVENTION

Figure 1:
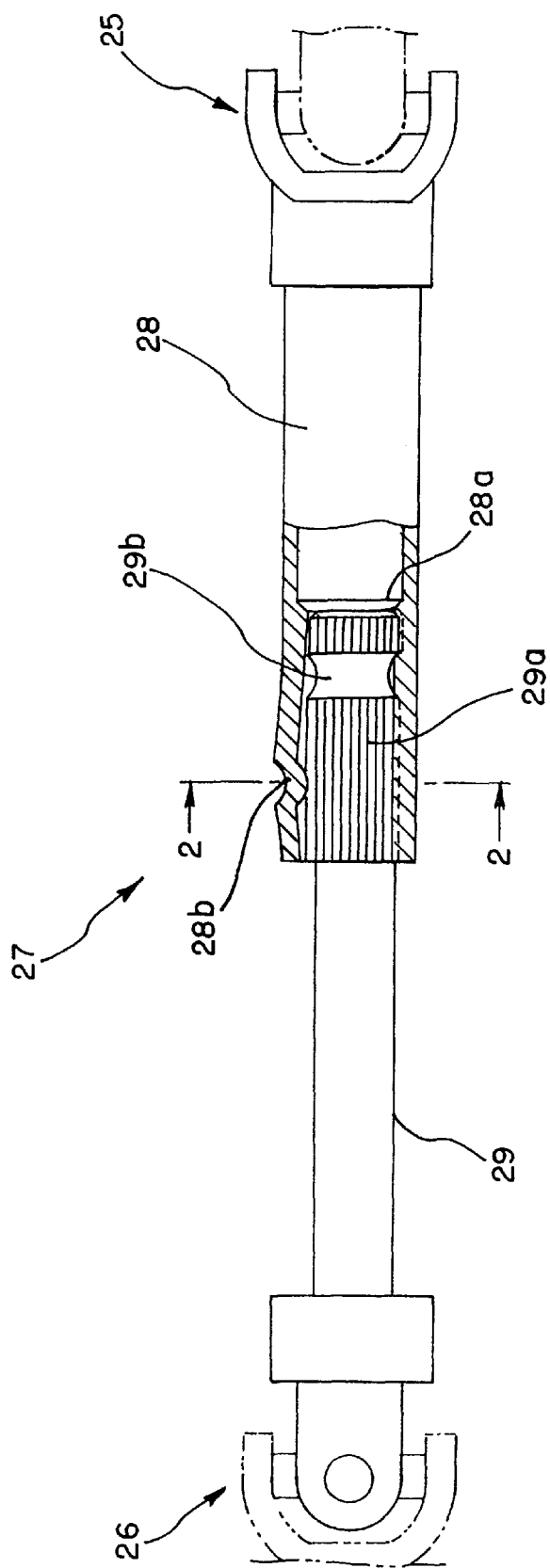
FIG. 1 is a side view of an intermediate shaft of a steering unit according to one embodiment of the present invention.

In FIG. 1, 25 and 26 represent universal joints respectively, and 27 represents an intermediate shaft. The intermediate shaft 27 comprises a hollow shaft 28 and an insertion shaft 29 that are engaged with each other so that the intermediate shaft 27 can shorten in the shaft direction. The hollow shaft 28 and the insertion shaft 29 are made of metallic material.

A female serration 28a is formed on the inner circumference of the hollow shaft 28. A male serration 29a engages with the female serration 28a of the hollow shaft 28. The male serration 29a is formed on the outer circumference of the insertion shaft 29. The female serration 28a and the male serration 29a are formed by a pulling process or a rolling process.

On a portion of the circumference of the hollow shaft 28, there is formed a depressed portion 28b that protrudes inward in a radial direction. On the outer circumference of the insertion shaft 29, there is formed a circumferential slot or concave portion 29b for permitting the formation of the depressed portion 28b, as will be described later.

The depressed portion 28b is arranged on the hollow shaft 28 such that the male serration 29a of the insertion shaft 29 engages with the depressed portion 28b. The engagement causes the male serration 29a of the insertion shaft 29 to contact under pressure with the female serration 28a at 180 degrees opposite to the depressed portion 28b. Thereby, the hollow shaft 28 and the insertion shaft 29 are fixed in the axial direction, and there is no play between the hollow shaft 28 and the insertion shaft 29 in a circumferential direction.

Now, the assembly method of the intermediate shaft 27 is explained with reference to FIG. 3.

Figure 3A:
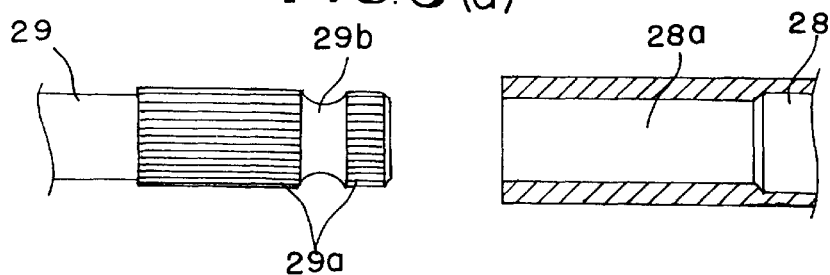
FIG. 3 is an explanatory diagram illustrating an assembly method of the intermediate shaft.
Figure 3B:
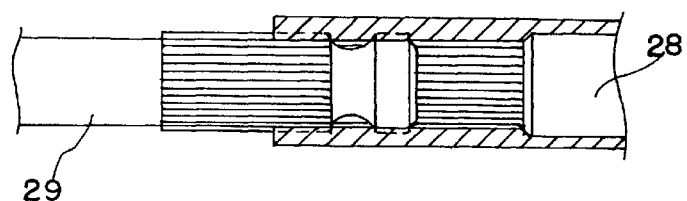

First, as shown in FIG. 3(a), the hollow shaft 28, having the female serration 28a on the inner circumference thereof is formed. Next, the insertion shaft 29, having the male serration 29a and the circumferential slot 29b on the outer circumference thereof is formed. The hollow shaft 28 and insertion shaft 29 are arranged coaxially, and, as shown in FIG. 3(b), the insertion shaft 29 is engaged halfway into the hollow shaft 28. The halfway position is short of the necessary engagement dimension, and a position where the circumferential slot 29b of the insertion shaft 29 goes into the inner circumference of the hollow shaft 28.

Figure 3C:
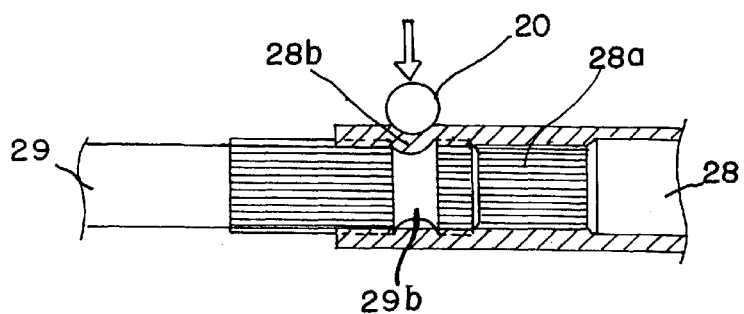

In this state, as shown in FIG. 3(c), roller 20 is contacted against the outer circumferential portion of the hollow shaft 28. The roller 20 is brought to bear against a portion of the hollow shaft 28 corresponding to the circumferential slot 29b of the insertion shaft 29. The roller 20 is pressed. A part of the circumferential surface of the hollow shaft 28 is impressed inward in a radial direction. This impression forms the depressed portion 28b.

The depressed portion 28b is formed on only part of the circumferential surface of the hollow shaft 28. Therefore, the circumferential slot 29b for forming the depressed portion 28b may also be formed on only part of the circumferential surface of the insertion shaft 29. By making the circumferential slot 29b extend completely around the circumference, as shown in the figures, circumferential positioning of the hollow shaft 28 and the roller 20 relative to the insertion shaft 29 is easy, which is advantageous.

The circumferential slot 29b is formed at a position spaced from the end of the insertion shaft 29. The roller 20 is engaged against the hollow shaft 28 at a position corresponding to the circumferential slot 29b. This relative positioning makes it possible to form the depressed portion 28b with excellent shape precision. As a counter example, if a small diameter portion were formed at the shaft end of the insertion shaft 29, the roller 20 would not engage into the circumferential slot 29b when forming the depressed portion 28b. The resulting shape of a depressed portion 28b, so formed, would not be constant. If a small diameter portion were formed at the shaft end of the insertion shaft 29, there would be no male serration 29a at the end of the insertion shaft 29. Therefore, positioning of the male serration 29a and the female serration 28a would not be possible when the end of the insertion shaft 29 is inserted from the end of the hollow shaft 28. The insertion shaft 29 would not engage smoothly with the hollow shaft 28. These problems will not occur with the present invention.

Figure 2:
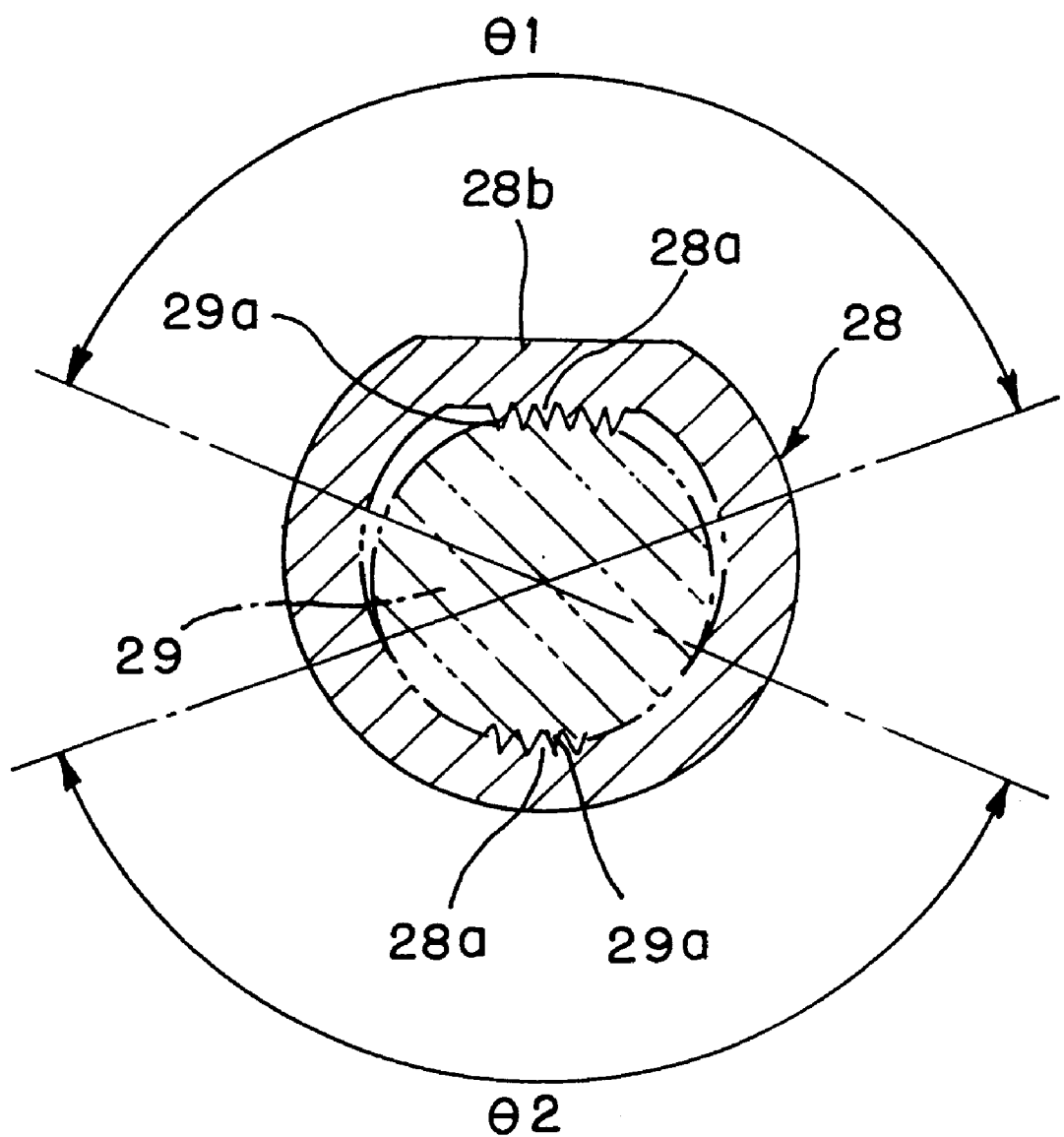
FIG. 2 is a cross section taken along line (2)—(2) in FIG. 1.
Figure 3D:
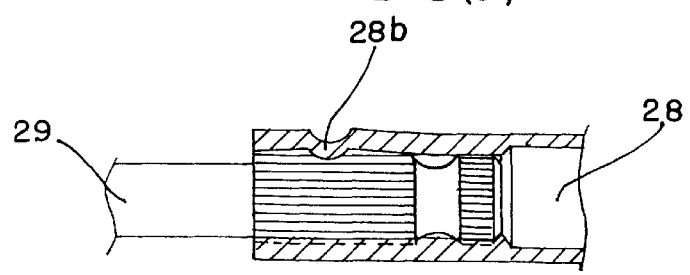

As shown in FIG. 2 and in FIG. 3(d), the insertion shaft 29 is further inserted into the hollow shaft 28 to the extent that the length dimension of the intermediate shaft 27 is satisfactory. At this stage, the existence of the depressed portion 28b makes the inner diameter of the hollow shaft 28 small, so the insertion shaft 29 is held under pressure.

In this pressure insertion process, part of the male serration 29a of the insertion shaft 29 is engagedly caught by the depressed portion 28b of the hollow shaft 28. The catching occurs because the depressed portion 28b in the hollow shaft 28 causes an angle area $\theta 1$ in a circumferential direction to swell a little outward in a radial direction. Therefore, the female serration 28a floats a little away from the male serration 29a, while the female serration 28a of another angle area $\theta 2$ is contacted to the male serration 29a under pressure.

In the above-mentioned structure, upon an impact load, the intermediate shaft 27 does not shorten rapidly and without resistance after a resin portion shears and absorbs impact, as in the conventional manner. By the present invention, impact absorption is continued until the male serration 29a of the insertion shaft 29 passes the depressed portion 28b of the hollow shaft 28. After this point, the intermediate shaft 27 shortens rapidly without resistance.

By the present invention, sufficient impact absorption is realized. Impact absorption is made by the plastic deformation of the depressed portion 28b of the hollow shaft 28. This plastic deformation causes the male serration 29a of the insertion shaft 29 to have a slide resistance with the female serration 28a. Resin is not used as in the conventional manner. Therefore, the present invention does not suffer deterioration owing to an ambient temperature, during the forming process. As a result, the draft load is maintained constant, hence high reliability of the impact absorption value is achieved.

In the present invention, the draft load of the intermediate shaft 27 may be varied by appropriately setting the depressed dimension of the depressed portion 28b of the hollow shaft 28, such as the size of the depressed portion 28b in the shaft direction and circumferential direction. This draft load will be set normally according to safety requirements.

In the case of the intermediate shaft 27 of the present invention, there is no need to have a hole in the hollow shaft 28 for receiving resin, as seen in the conventional hollow shaft 8. Therefore, the number of production processes is reduced. The insertion shaft 29 may be produced in the same number of production processes as that for the conventional insertion shaft 9. Although it is necessary to add a pressure process to insert the insertion shaft 29 into the hollow shaft 28, the process is simple and less time-consuming, compared with the resin filling and hardening process in the prior art.

By the present invention, production costs may be reduced to a great extent. Since a relatively large depressed portion 28b is formed on the hollow shaft 28, by use of the circumferential slot 29b of the insertion shaft 29, even if the depressed portion 28b springs back, the shape precision of the depressed portion 28b can be maintained.

Thereby, a sufficient draft load can be attained. For instance, in the prior art, a method is disclosed where the hollow shaft 8 and the insertion shaft 9 are engaged through serration.

A part of the outer circumference of the hollow shaft 8 is deformed by a pressure, forming an engagement area of the shafts 8 and 9. However, in this case, only a little amount of the pressure deformation of the hollow shaft 8 can occur. Sufficient deformation is not possible because of a spring back of the deformed portion. Accordingly, the connection strength between the hollow shaft 8 and the insertion shaft 9 becomes insufficient. It is impossible to obtain sufficient draft load, and once again the nonconformities arising from the prior art occur.

Compared with these conventional methods, the structure according to the present invention appears to be excellent. The present invention may be embodied in other specific forms without departing from the spirit or essential characteristics thereof. The present embodiments are therefore to be considered in all respects as illustrative and not restrictive.

For example, the hollow shaft 28 and the insertion shaft 29 may be engaged by splines. The depressed portion 28b to be formed on the hollow shaft 28 may be arranged not on a single position, but on several positions in an axial direction. Further, the depressed portion 28b may be spotted on several positions in a circumferential direction. In this case, it is necessary to rearrange the hollow shaft 28 to adjacent positions in the circumferential direction.

In forming the depressed portion 28b, the roller 20, as mentioned above, need not be used. Instead, an appropriate material attached to a press rod of a press machine may be used. Moreover, a single ball, or several hard balls, may be used.

Figure 4:
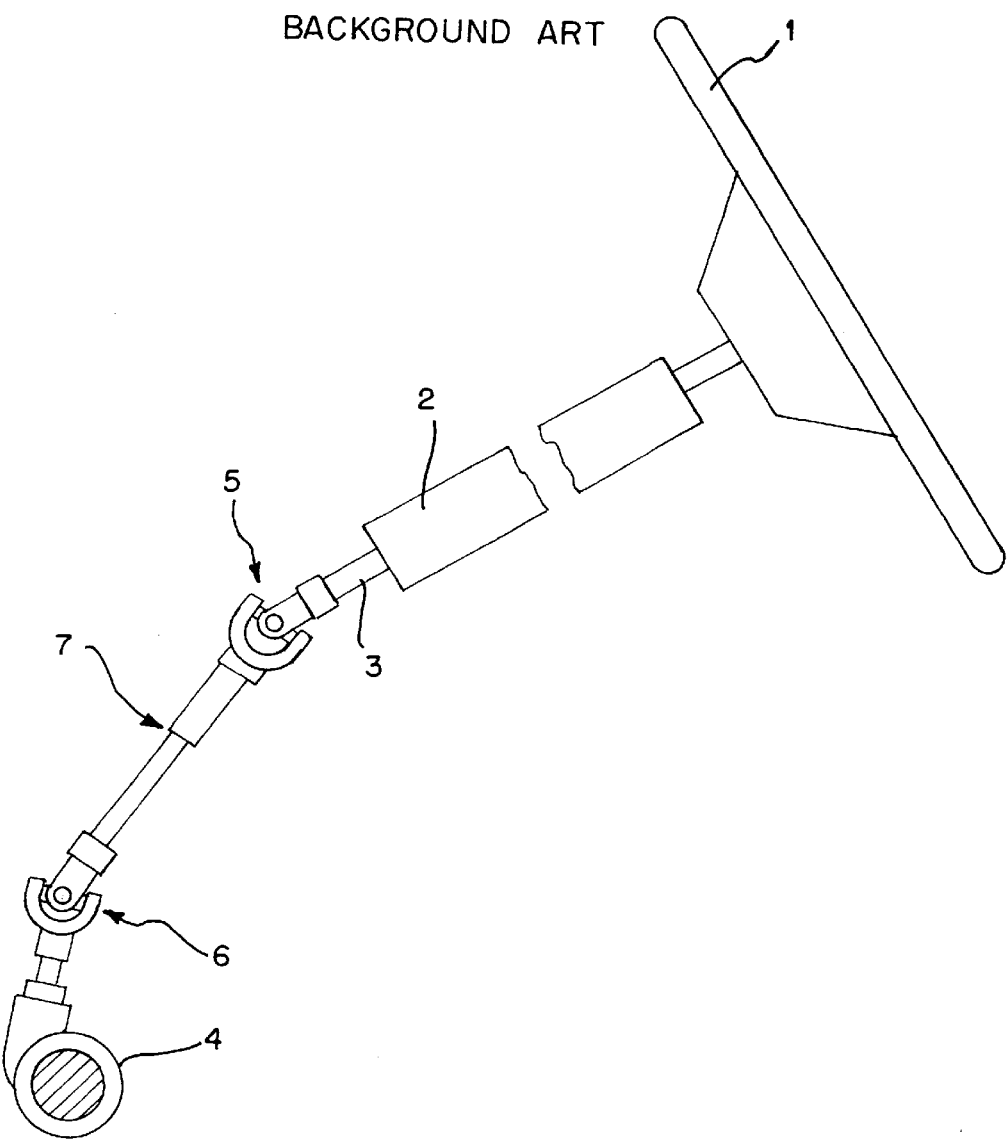
FIG. 4 is a side view of a conventional steering unit.
Figure 5:
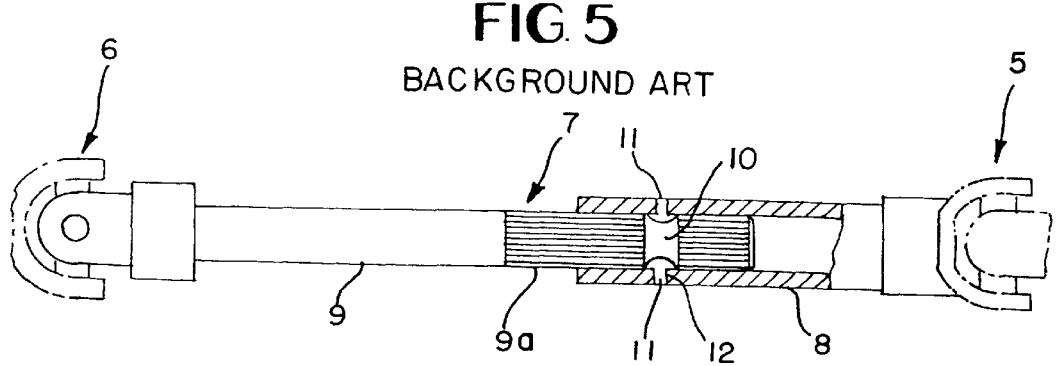
FIG. 5 is a side view of an intermediate shaft of the conventional steering unit.

In the above embodiment, the power transmission shaft of a steering unit is the intermediate shaft 27 arranged between the steering shaft 3 and the steering gear 4 in the steering unit in an automobile, as shown in FIG. 4. However, the present invention may be used for the steering column 2, arranged between the steering shaft 3 and the steering wheel 1. In the case of the steering column 2, the steering column 2 comprises a hollow shaft and insertion shaft similar to those in the intermediate shaft 27. The hollow shaft and insertion shaft in this case would be arranged so as to have the same impact absorption structure as the above-mentioned embodiment.

While there has been described what is at present considered to be preferred embodiments of the present invention, it will be understood that various modifications may be made. It is intended that the appended claims cover all such modifications as fall within the true spirit and scope of the present invention.

What is claimed is:

1. A method for assembling an impact absorbing, power transmission shaft of a steering unit that shortens in an axial direction upon an impact load, above a specified impact load, said method comprising the steps of:

providing an insertion shaft having an outer circumference;

forming a first serration on the outer circumference;

forming a concave portion extending radially inward in a portion of the insertion shaft formed with the first serration;

providing a hollow shaft having an inner circumference;

forming a second serration on the inner circumference;

inserting the insertion shaft into the hollow shaft for a predetermined length;

deforming a portion of the hollow shaft, to thereby form a radially inward, depressed portion in the inner circumference of the hollow shaft which contacts the concave portion of the insertion shaft; and further inserting the insertion shaft into the hollow shaft, so that the depressed portion leaves the concave portion and engages the first serration of the outer circumference of the insertion shaft to thereby provide a frictional engagement between the insertion shaft and the hollow shaft.

2. The method according to claim 1, wherein said step of forming the first serration includes forming the first serration entirely around the outer circumference of the insertion shaft.

3. The method according to claim 1, wherein said step of forming the second serration includes forming the second serration entirely around the inner circumference of the hollow shaft.

4. The method according to claim 1, wherein said step of forming the concave portion includes forming the concave portion entirely around the outer circumference of the insertion shaft.

5. An impact absorbing, power transmission shaft of a steering unit that shortens in an axial direction upon an impact load, above a specified impact load, said shaft comprising:

an insertion shaft having an outer circumference;

a first engaging portion formed on said outer circumference;

a concave portion extending radially inward in a portion of the insertion shaft formed with said first engaging portion;

a hollow shaft having an inner circumference;

a second engaging portion formed on said inner circumference; and a depressed portion extending radially inward from said inner circumference of said hollow shaft and contacting a portion of said first engaging portion, spaced from said concave portion, to thereby provide a frictional engagement between said insertion shaft and said hollow shaft.

6. The shaft according to claim 5, wherein said first engaging portion comprises a male serration, and said second engaging portion comprises a female serration.

7. The shaft according to claim 6, wherein said male serration is formed entirely around said outer circumference of said insertion shaft.

8. The shaft according to claim 6, wherein said female serration is formed entirely around said inner circumference of said hollow shaft.

9. The shaft according to claim 5, wherein said concave portion is formed entirely around said outer circumference of said insertion shaft.

* * * * *